United States Patent [19]

Massey

[11] 4,087,655
[45] May 2, 1978

[54] CABLE TERMINATING AND TESTING UNIT

[75] Inventor: Alan William Massey, Radlett, England

[73] Assignee: The Post Office, London, England

[21] Appl. No.: 665,114

[22] Filed: Mar. 8, 1976

[30] Foreign Application Priority Data

Mar. 12, 1975 United Kingdom ............... 10366/75

[51] Int. Cl.² .................... H04M 3/22; H01R 9/08
[52] U.S. Cl. .................... 179/175; 179/1 PC; 339/18 R; 339/198 G; 339/218 R
[58] Field of Search ............. 179/175, 175.1 R, 1 PC; 339/18 R, 150 B, 150 T, 151 B, 198 G, 214 R, 214 C, 214 S, 215 R, 215 S, 218 R

[56] References Cited

U.S. PATENT DOCUMENTS

| 3,509,297 | 4/1970 | King ........................... 179/175 |
| 3,518,611 | 6/1970 | Shores ...................... 339/18 R |
| 3,537,061 | 10/1970 | Haag et al. ................. 339/218 R |
| 3,601,772 | 8/1971 | Mancini .................... 339/198 G |
| 3,760,328 | 9/1973 | Georgopulos ............. 339/18 R |
| 3,936,133 | 2/1976 | Splitt et al. ................ 339/18 R |

FOREIGN PATENT DOCUMENTS

| 522,835 | 3/1956 | Canada ...................... 339/218 R |
| 931,960 | 8/1953 | Germany .................. 179/175 |
| 1,234,480 | 6/1971 | United Kingdom. |
| 1,241,488 | 8/1971 | United Kingdom. |

Primary Examiner—Douglas W. Olms
Attorney, Agent, or Firm—Hall & Houghton

[57] ABSTRACT

An element for a terminating and testing unit for use in a telecommunications exchange is described. The element comprises a strip of insulating material having slots in opposite faces thereof in which conducting members are housed. The conducting members project from one edge of the strip to provide tag connection facilities for conductors and pairs of members interengage adjacent the other edge of the strip to provide socket connection facilities. A plug can be inserted between a pair of conducting members to break the contact of the members and establish contact between conducting surfaces of the plug and the members.

The elements can be clamped together side-by-side to form a terminating and testing unit. Such a unit is very economical in its use of space.

11 Claims, 19 Drawing Figures

CABLE TERMINATING AND TESTING UNIT

This invention relates to electrical connectors. The invention is particularly concerned with an element for a terminating and testing unit suitable for use in a telecommunications exchange and also extends to a terminating and testing unit incorporating a plurality of such elements.

A characteristic requirement of the design of such units is that while providing ready access to conductors for testing purposes, the units should be as compact as possible; this latter requirement is important because of the very large number of conductors terminating at a telecommunications exchange.

British patent specification No. 1,241,488 describes a break-jack assembly for an automatic telephone exchange main distribution frame. The assembly has an insulating housing divided into a number of separate compartments in each of which a pair of contact springs are located. The contact springs are normally in electrical contact connecting the lines to the exchange equipment but on insertion of a suitable insulating plug between a pair of contact springs, the latter are forced apart; the insulating plug is also provided with a pair of conducting tabs which, on insertion of the plug, engage respective contact springs between the springs and the walls of the housing. This connection provides a line testing facility. The contact springs are also provided with terminals extending out of the insulating housing for connection to an external lead. The insulating housing is made up of two components secured together after installation of the contact springs.

This break jack assembly suffers the disadvantage of being of complex design and the provision of a separate compartment for each pair of spring contacts considerably increases the area required to house the contacts.

It is an object of the invention to provide an improved element for a terminating and testing unit suitable for use in a telecommunications exchange which is economical in its use of space.

According to the invention this object is achieved by using as a mounting for the conductors in a terminating and testing unit, a strip of insulating material having first and second slots in respective opposite faces thereof to locate respective first and second conducting members, said slots communicating in a region adjacent one edge of the strip to allow said members to interengage to provide a socket connection facility. A terminating and testing unit made up of a number of such elements placed side-by-side enables a greater packing density of conductors to be achieved than in prior art terminating and testing units. An example of a packing density achievable by the use of the invention is 10,000 lines (conductor pairs) in 3.15 square meters.

A wall of the strip defining said region can be provided with teeth projecting into the socket to cooperate with a plug member to resist withdrawal of said plug member. Said element can have a plurality of said first and second slots to locate a plurality of said first and second conducting members to provide a plurality of said socket connection facilities spaced along one edge of the strip.

According to another aspect of the invention there is provided an element for a terminating and testing unit suitable for use in a telecommunications exchange, said element comprising a strip of insulating material having first and second slots in respective opposite faces thereof, a first conducting member located in said first slot and having a portion projecting from one edge of the strip to provide a first tag connection facility, a second conducting member located in said second slot and having a portion projecting from said one edge to provide a second tag connection facility, said slots communicating in a region adjacent the other edge of the strip in which region said members interengage and provide a socket connection facility.

Said socket connection facility can be provided by respective first and second jaws on said first and second conducting members.

Said second conducting member can have a spring portion tensioned between an anvil portion of said first conducting member and a side wall of said second slot.

Said anvil portion of said first conducting member can abut a corresponding portion of said strip but said second jaw can be resiliently biased to a location spaced from said strip.

Said first and second conducting members can interengage at a location spaced from said first and second jaws.

Said projecting portion of one of said conducting members can project further from said one edge than said projecting portion of the other conducting member.

Said further projecting portion of said conducting member can have an insulating collar over a part of its length.

Said collar can be tapered away from the body of the strip.

Said further projecting portion can be provided with notches to facilitate tag connection.

Said first conducting member can be generally crank shaped.

Said conducting members can be composed of tin coated nickel/silver alloy.

Said element can have a plurality of said first and second conducting members, said members providing a plurality of said tag connection facilities spaced along said one edge of said strip and a plurality of said socket connection facilities spaced along the other edge of the strip.

According to a further aspect of the invention there is provided a cable terminating and testing unit suitable for use in a telephone exchange, said unit comprising a plurality of elements, each element being as claimed in any of claims 1 to 11, clamped together side-by-side to form a block having tag connection facilities arranged over one face and socket connection facilities arranged over the opposite face.

At the interfaces between adjacent elements in the unit, respective slots in the adjacent faces can be offset from one another to prevent the conducting members located in said respective slots from conducting at said interfaces.

Said projecting portions of said other conducting members can be located between respective aligned collars of adjacent elements to leave a plurality of passageways between adjacent rows of aligned collars.

Said strips can be recessed along the paths of said passageways to form a plurality of channels.

Said elements can be clamped between a pair of end plates, one of said end plates having an edge portion projecting outwardly from said one block face, which edge portion has holes therein aligned with said passageways.

An embodiment of the invention will now be described by way of example with reference to the accompanying drawings in which:

FIGS. 2 to 8 and FIG. 13 being drawn to a smaller scale than FIGS. 1 and 9-12;

Figure 11:
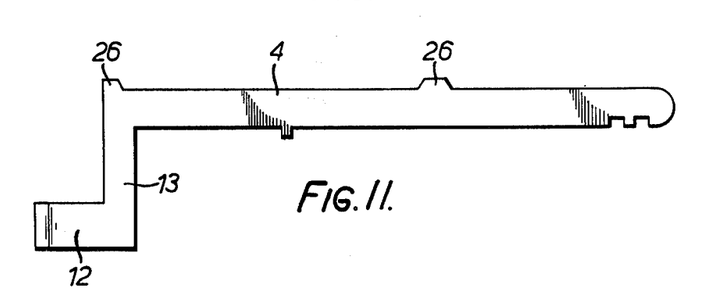
FIGS. 11 and 12 show conducting members forming part of the element.
Figure 12:
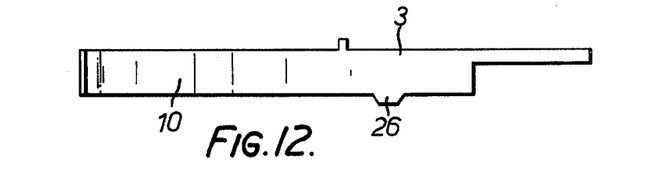

Referring to FIGS. 1 to 8 in detail there is shown an element 1 for a terminating and testing unit suitable for use in a telecommunications exchange the element generally comprising a rigid plastics strip 2, a plurality of conducting members 3 of one type and a plurality of conducting members 4 of another type, one of each type of the conducting member being shown detached from the element 1 in FIGS. 11 and 12. The conducting members are composed of springy metal, preferably tin-coated nickel/silver alloy. The conducting members 3 and 4 are located in respective slots 5 and 6 which are formed during heat moulding of the strip, or subsequently by machining, in respective faces 7 and 8.

Figure 1:
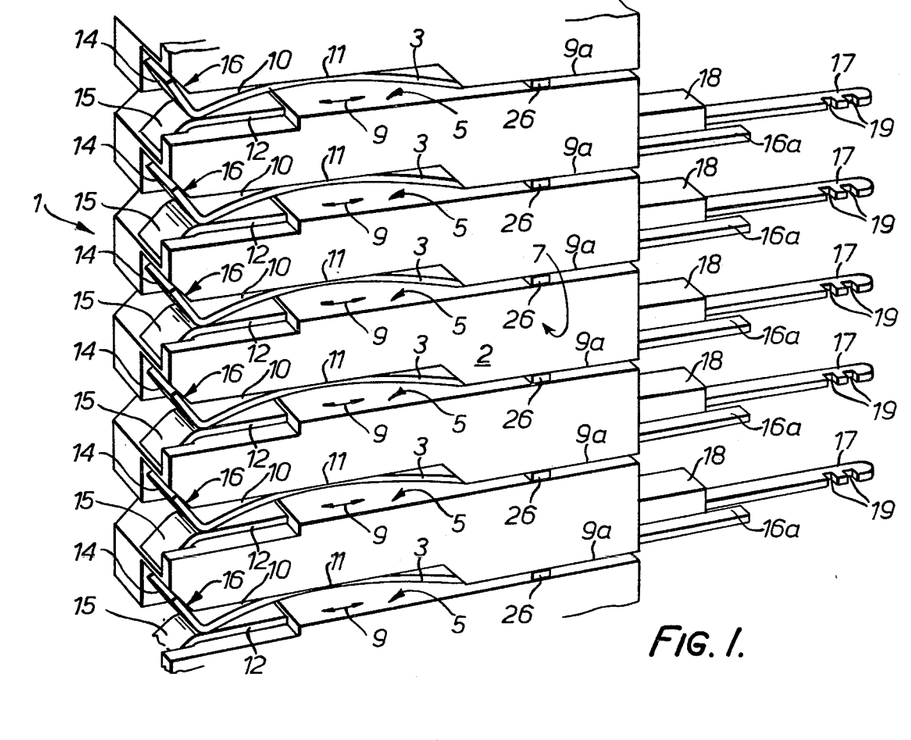
FIG. 1 is a perspective view of part of an element according to the invention.

Each of the slots 5 has a housing portion 9 of greater width than the rest of the slot 9a; the housing portions house curved parts 10 of the respective conducting members 3. Each of the curved parts 10 bears on one side against a surface 11 of the housing portion 9 and on the other side against an anvil portion 12 of an adjacent one of the conducting members 4. The parts 10 are sprung against their respective housing portions.

Figure 8:
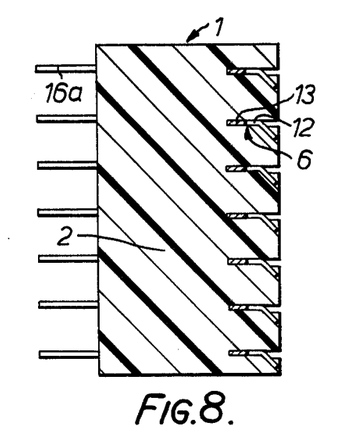

The anvil portion 12 of each conducting member 4 is integral with a neck portion 13 which, as shown in FIG. 8 is located in a portion of the associated slot 6 of increased depth. In the region of each anvil portion 12, the associated slots 5 and 6 communicate and jaws 14 and 15 on the associated conducting members 3 and 4 bear against one another.

The strip 2 is so shaped at 16 as to allow movement of the jaw 14 away from the jaw 15 when an object is pushed between the jaws, the spring portion 10 ensuring that the object will be gripped by the jaws.

The conducting members 3 and 4 have at their other ends, portions 16a and 17 respectively which project from the edge of the strip 2. The portions 17 project further from the strip edge than the portions 16a and each is surrounded on three sides along an inner part by an insulating block 18 formed integrally with the strip 2. The portion 17 is formed with notches 19 whose use will be explained with reference to the description of the operation of the element 1.

Figure 9:
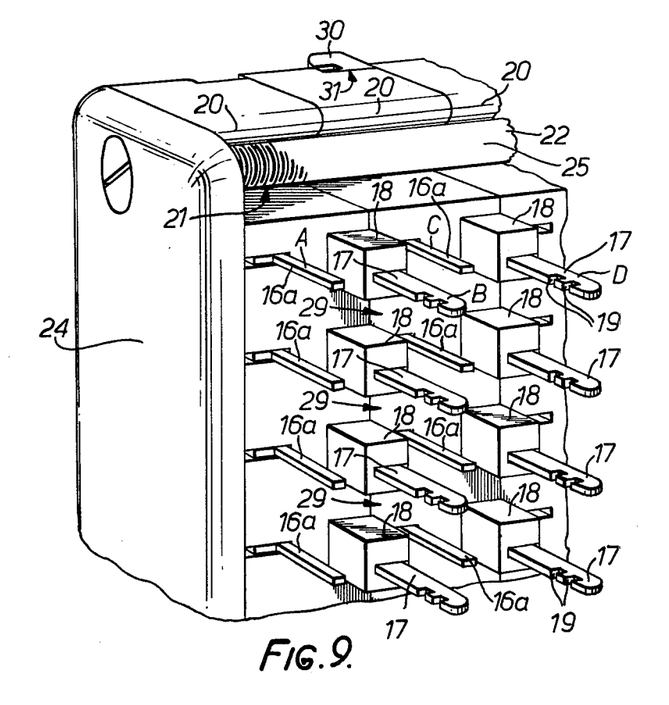
FIGS. 9 and 10 are perspective views from opposite faces of part of a cable terminating and testing unit incorporating a plurality of the elements of FIGS. 1 to 8.
Figure 10:
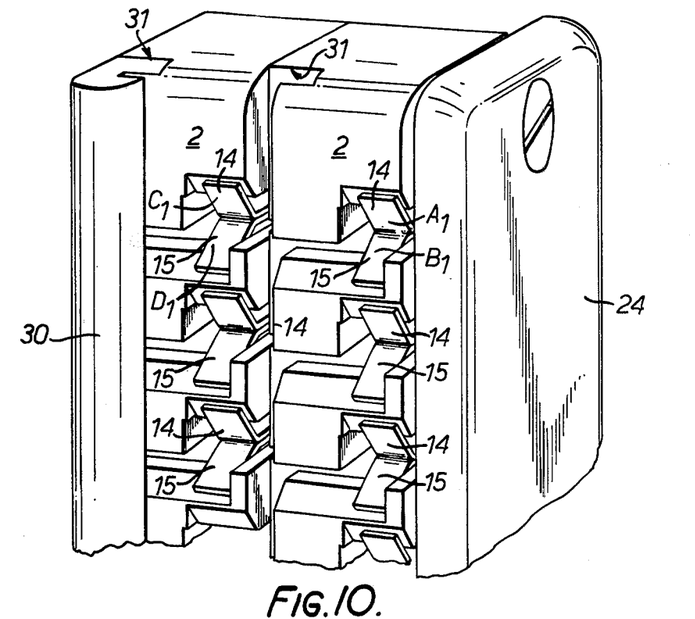

Referring to FIGS. 9 and 10, there is shown a part of a cable terminating and testing unit which includes several (for example, 10) of the elements 1 described with reference to FIGS. 1 to 8. Part of two elements can be seen in FIG. 10 and part of four in FIG. 9.

Figure 13:
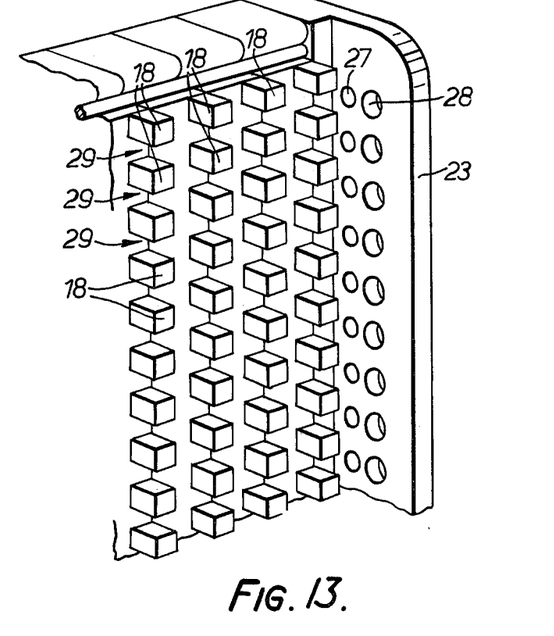
FIG. 13 shows a fanning strip forming part of the terminating and testing unit.

The back plate 23 shown in FIG. 13, as well as performing a clamping function, also serves, in use, as a fanning strip; ie a strip having holes through and by which individual conductors or sets of conductors are led from a cable to chosen locations, in this case the projecting portions (or tags) 16a and 17. The back plate or fanning strip 23 has a series of holes 27 and 28 extending through it. The series of holes is arranged down the side of the plate with a spacing such that in the assembled condition as shown schematically in FIG. 13, each horizontal set of holes 27 and 28 is aligned with the row of spaces between the respective horizontal rows of blocks 18. As can be seen from FIG. 9, the projecting portions 16a are not in line with the horizontal rows of spaces, so a series of horizontal passages 29 is available for laying in conductors or sets of conductors after they have been led through the holes 27 and 28.

The installation and operation of a single terminating and testing unit will now described with particular reference to a telephone exchange. A cable, (not shown), is led into the exchange and the conductor pairs of the cable are split into groups. Each group is led through one of the smaller holes 27 (FIG. 13) and laid along a passage 29. Individual conductors of the group are then led upwardly to respective ones of the upwardly adjacent row of tags 16a where they are terminated using, for example, a known wire wrapping technique.

The top (and the bottom (not shown)) of each element 1 is formed with an end portion 20 which provides a guideway 21 in which a screw-threaded tie member 22 is located. Each tie member extends from a back plate 23 (shown in FIG. 13) to a front plate 24, the elements being securely clamped between the two plates by the tie members. The guideway 21 allows extraction of individual elements 1 when the tie member ends are partially unscrewed.

Figures 2, 3:
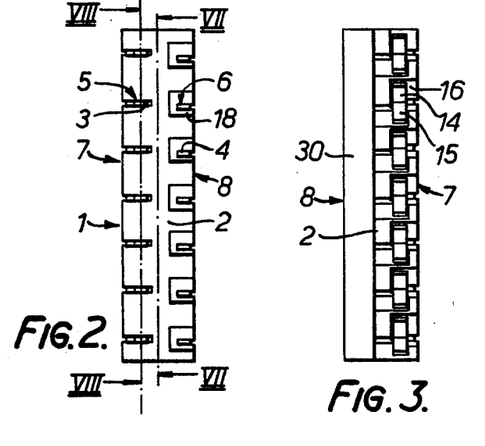
FIGS. 2 and 3 are elevations from opposite sides of the element of FIG. 1 drawn to a smaller scale.
Figure 4:
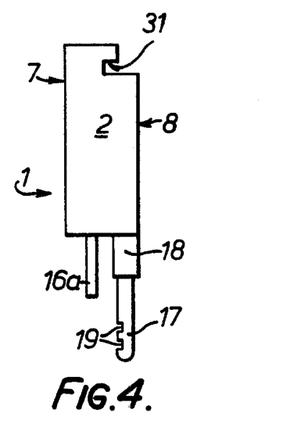
FIG. 4 is a bottom elevation of the element.
Figures 5, 6:
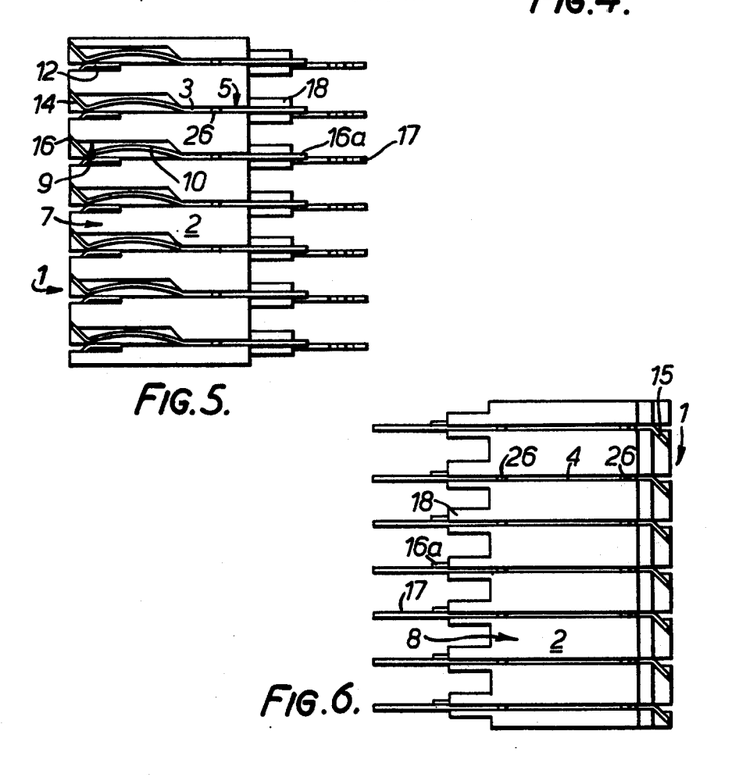
FIGS. 5 and 6 are elevations from opposite faces of the element.
Figure 7:
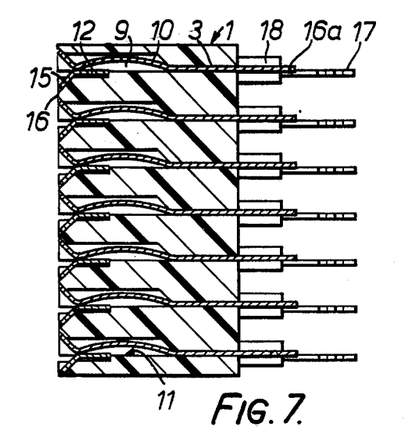
FIGS. 7 and 8 are sectional views on the lines VII—VII and VIII—VIII respectively of FIG. 2.

As can be seen from FIG. 2, the array of slots 3 in the face 7 of an element are offset vertically with respect to the array of slots 4 in the face 8. Since the elements 1 are all identical, when they are clamped together to form the regular block structure, part of which is shown in FIGS. 9 and 10, the conducting member 3 at the surface 7 of any one element 1 will not come into electrical contact with the conducting member 4 at the surface 8 of the next adjacent element. In order to guard further against electrical contact between the members they are formed with feet 26 which are flush with the respective faces 7 and 8 when the members 3 and 4 are properly located. When adjacent elements 1 are clamped together, the feet 26 of the respective members serve to maintain the main body of each conducting member spaced from the interface between elements. In the direction of the slots, the feet on members 3 are offset from the feet on members 6 so that the foot on a member 3 cannot touch the foot of an adjacent member 4.

Groups of jumpers, i.e. wires connecting different parts of the exchange, to the cable conductors, are led through respective ones of the larger holes 28 in the fanning strip, the jumper groups being laid over the groups of conductor pairs. Individual ones of the jumpers are led upwardly to respective ones of the upwardly adjacent rows of tags 17, which extend further from the unit face than the tags 16a, the jumpers being terminated at the notches 19 by, for example, a known soldering technique.

Electrical connections between adjacent jumpers and conductor tags, for example tags A and B in FIG. 9 are produced by interengagement between adjacent jaws 14 and 15, for example the jaws $A_1$ and $B_1$ of FIG. 10.

Access to the circuits for testing or other purposes is obtaining by pressing a laminated break plug blade (not shown) into the socket formed by an adjacent pair of jaws 14 and 15. The blade has a pair of conducting faces flanking an insulating leaf, the conducting surfaces being connected to one another through a test circuit.

In fact, to test a telephone circuit it will be necessary to test a circuit including a pair of conductors which will, for example, be terminated at the horizontally aligned tags A and C (FIG. 9). To ensure that a test probe cannot be used to connect one leg of one telephone circuit to one leg of another telephone circuit, spacer members 30 are located in grooves 31 in such a position that a probe of preformed shape having a pair of plug blades can be inserted only in horizontally aligned sockets which form a pair. For example, in FIG. 10 the probe could be inserted in sockets $A_1 B_1$ and $C_1 D_1$ but the spacer 30 would prevent insertion in $C_1 D_1$ and the socket (not shown) to the left, in FIG. 10, of $C_1 D_1$.

Figure 14:
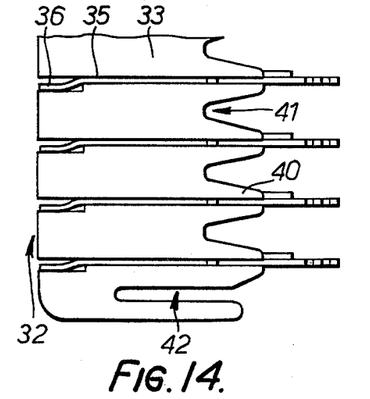
FIGS. 14 and 15 are elevations of part of another element according to the invention from opposite sides of the element.
Figure 15:
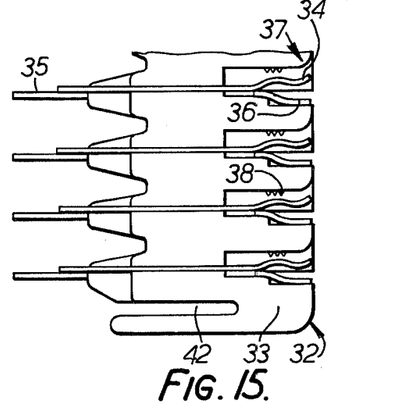
Figure 16:
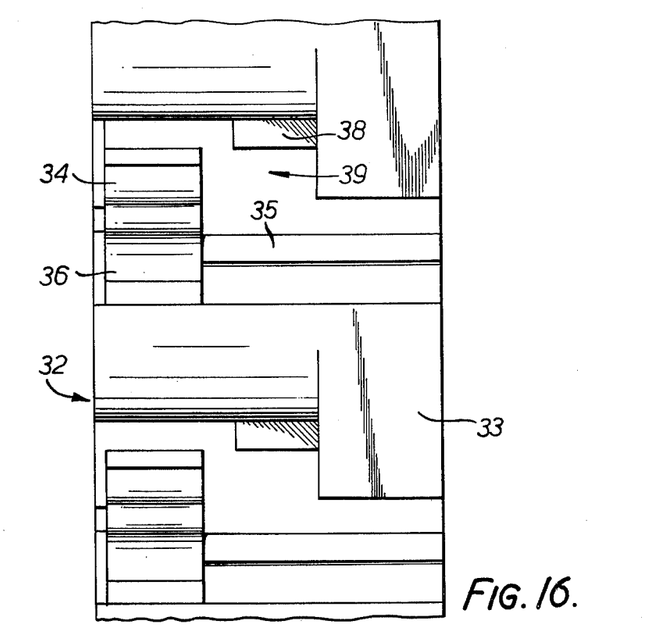
FIG. 16 is an enlarged end elevation of the element.

FIGS. 14 to 16 show another form of element embodying the invention which, as can be seen from the drawings, is similar to the element shown in FIG. 1, but which includes a number of modifications. The description of the construction and operation of the second element will therefore be confined largely to the substance of the modifications incorporated in the element of FIGS. 14 to 16.

Referring first to FIGS. 14 and 15, an element 32 for a terminating and testing unit comprises a rigid strip 33, a plurality of conducting members 34 of one type and a plurality of conducting members 35 of another type. The conducting members 34 and 35 are of the same outline when seen in plan view as the shape of conducting members 3 and 4 respectively as shown in FIGS. 11 and 12. However as can be seen in FIGS. 14 and 15 the conducting members 34 and 35 are of a different shape, when seen in elevation, at the ends where they contact each other. The conducting member 35 has a substantially flat anvil portion 36 which abuts a correspondingly flat part of the strip 33. The conducting member 34 has a generally 's' shaped end portion one end of the "s" being in contact with the member 35 and the remaining part of the "s" defining, in combination with the anvil part of the member 35 a pair of jaws forming a socket into which a plug can be inserted. The conducting member 34 is so shaped that when located in the strip 33, it is resiliently biased into contact with the member 35 by spring tension in the conducting member 34. The strip 33 is so formed in the region 37 as to allow movement of the jaw on the member 34 away from the member 35.

A further modification incorporated in the element 32 is the provision of a toothed section 38 on a wall of the strip 33. As can be seen most clearly in FIG. 16 the toothed section is provided to one side of the conducting members and constitutes one wall of an open recess 39. This recess, which is not present in the element shown in FIG. 1, is provided to receive a correspondingly toothed portion of a plug 43.

Figures 17A, 17B, 18:
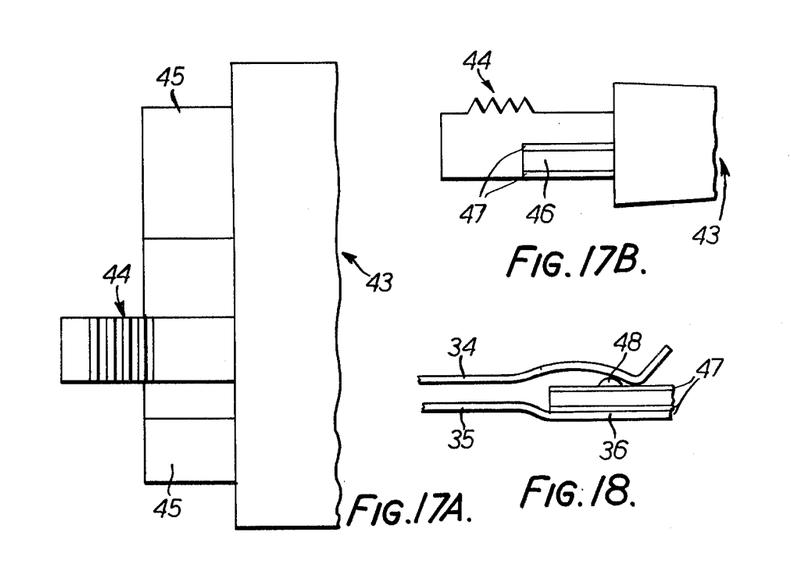
FIG. 17A is an enlarged plan view of a plug suitable for use with the element of FIGS. 14 to 16.
FIG. 17B is an enlarged elevation view of the plug.
FIG. 18 is a schematic illustration of a modified form of the plug inserted into the element of FIGS. 14 to 16.

The socket engaging portion of the plug 43 is shown in FIGS. 17A and 17B. As can be seen in the drawings the plug has a central toothed portion 44 which is inserted into the recess 39 when a connection is made. The plug and recess are dimensioned so that the plug can be fitted therein without the teeth engaging; however if leads to the plug 43 are accidentally pulled so that the plug assumes a downwardly slanted position, the teeth on the plug and recess interengage to prevent unwanted removal of the plug. On each side of the toothed portion 44 there is a break plug blade 45 composed of an insulating leaf 46 flanked on each side by conducting surfaces 47.

Referring again to FIGS. 14 and 15, the ends of the conducting members 34 and 35 distant from the jaws are of the same shape as in the first embodiment. An insulating collar 40 integral with the strip 33 is provided around three sides of the conducting member 35 and as shown in the drawings this collar is tapered away from the body of the strip. Between adjacent collars 40 there are recesses 41 provided in the strip 33; the purpose of these recesses will be described later.

The elements 32 can be secured together side by side in the same way as the elements 1 of the previously described embodiment. In one particular example ten elements are secured together, each element having twenty sockets. The top (not shown) and bottom of each of the elements 32 is provided with a guideway 42 in which a screw threaded tie member is secured as before between a back plate and a front plate.

The element 32 is not provided with grooves to locate spacer members between adjacent elements as is the element of FIG. 1; instead a second type of element is inserted between neighbouring elements 32; this second type of element is very similar to the element 32 but it is not provided with a recess 39 to receive the toothed part of the plug 43. Consequently, when the elements are clamped together side by side with the two types of elements alternating, the plug 43 can only be inserted with the left hand blade (as seen in FIG. 17A) in the element 32 of the first type (so that the toothed part 44 of the plug is located within this same element). Thus the plug 43 can only be inserted into adjacent pairs of sockets and not adjacent unpaired sockets; it should be noted that the plug cannot be inverted since the toothed part 44 would be unable to fit the recess 39 in the element 32.

When the elements 32 are secured together as just described the recesses 41 on adjacent elements will be aligned so that a plurality of channels are formed between the tags on conducting members 34 and 35. As in the first described embodiment the back plate can also serve as a fanning strip and conductors or sets of conductors can pass through holes in the fanning strip and along the channels formed by the recesses 41.

The operation and installation of the terminating and testing unit will be generally the same as for the previously described unit and will not therefore be described again; however the mechanism of insertion of a plug into a socket is somewhat different owing to the different shape of the conducting members and this will now be described.

The jaws of the conducting members prior to insertion of the plug 43 have a separation slightly less than the depth of the plug. Upon insertion of the plug 43 into the socket, the jaws of the conducting members 34, 35 are forced further apart so that the conducting members break contact with each other and make contact with respective faces of a break plug blade 45. Thus in the arrangement just described considerably less bending of the conducting member 34 is incurred than in the element shown in FIG. 1; consequently the conducting member 34 is exposed to correspondingly less severe stresses.

While two specific embodiments of the invention have been described it will be clear that many modifications of the embodiments can be made and some of these will be described below.

As has already been described the slots in the plastics strip can be formed by heat moulding of the strip or subsequently by machining. It may be convenient, particularly in the case where the slots in the plastics strip are moulded, to reduce the amount of plastics material in each strip. In this case the faces 7 and 8 (and the corresponding faces in the element 32) can be subject to substantial coring to economise on material, as is usual in the manufacture of moulded articles. In particular, the side walls of the slots abutting the conducting members may be discontinuous, and they may be formed as a number of separated portions for locating the conducting members.

As an alternative to or in addition to the provision of interlocking teeth to retain the plug 43 in the unit, a small rounded pip 48 can be provided protruding from the upper contact surfaces 47 of the plug so that when the plug is fully inserted into a pair of sockets the pips advance into the socket just beyond the narrowest separation of the conducting members 34, 35 to the position illustrated schematically in FIG. 18. In this position the plug is secured in the socket and is also prevented from rotating substantially in the horizontal plane.

What is claimed is:

1. An element for a terminating and testing unit suitable for use in a telecommunications exchange, said element comprising:
    a one-piece strip of insulating material having walls on one face of the strip defining a multiplicity of first conducting member locating slots and walls on the other face of the strip defining a like multiplicity of second conducting member locating slots, the first and second slots being distributed along the length of the strip and running transversely of the strip from one edge to the other;
    a part of said strip defining a like multiplicity of recesses in said other edge thereof in each of which respective first and second slots communicate,
    a like multiplicity of first conducting members located in respective first slots and having respective tag connection portions projecting from said one edge of the strip,
    a like multiplicity of second conducting members located in respective second slots and having respective tag connection portions projecting from said one edge of the strip,
    a like multiplicity of first socket portions provided on respective first conducting members and located in respective recesses, and
    a like multiplicity of second socket portions provided on respective second conducting members, located in respective recesses and cooperating with respective first socket portions to define respective sockets at said other edge of the strip.

2. An element according to claim 1 in which parts of the strip defining said recesses are provided with teeth projecting into said recesses to cooperate with a toothed plug member to resist accidental withdrawal thereof.

3. An element according to claim 1 in which each of said second conducting members has a spring portion stressed between a side wall of a respective one of said second slots and an anvil portion of the associated first conducting member abutting a surface of the insulating material strip.

4. An element according to claim 3 in which said anvil portion of each of said first conducting members abuts a corresponding portion of said strip but each of said second socket portions is resiliently biassed to a position spaced from said strip.

5. An element according to claim 3 in which each of said first conducting members has a body portion with said tag connection portion at one end and at the other end a cranked part forming said anvil portion.

6. An element for a terminating and testing unit suitable for use in a telecommunications exchange, said element comprising:
    a one-piece strip of insulating material having walls on one face of the strip defining a multiplicity of first conducting member locating slots and walls on the other face of the strip defining a like multiplicity of second conducting member locating slots, the first and second slots being distributed along the length of the strip, running transversely of the strip from one edge to the other and each of the first slots being offset from a respective associated second slot;
    a part of said strip defining a like multiplicity of recesses in said other edge thereof in each of which associated first and second slots communicate;
    a like multiplicity of first conducting members positioned edgewise in respective first slots and having respective tag connection portions projecting from said one edge of the strip;
    a like multiplicity of second conducting members positioned edgewise in respective second slots and having respective tag connection portions projecting from said one edge of the strip;
    a like multiplicity of first socket portions provided on respective first conducting members and located in respective recesses; and
    a like multiplicity of second socket portions provided on respective second conducting members, located in respective recesses and cooperating with respective first socket portions at said other edge of the strip,
    each pair of cooperating first and second socket portions comprising first and second plug engaging portions at the ends of the first and second conducting members respectively for engaging a test plug inserted therebetween and first and second contact portions on the first and second conducting members respectively spaced from the first and second plug engaging portions and resiliently biassed into contact with each other.

7. A cable terminating and testing unit suitable for use in a telephone exchange, said unit comprising a plurality of elements clamped together in face-to-face relationship to form a block, each of said elements comprising
    a one-piece strip of insulating material having walls on one face of the strip defining a multiplicity of first conducting member locating slots and walls on the other face of the strip defining a like multiplicity of second conducting member locating slots, the first and second slots being distributed along the length of the strip, running transversely of the strip from one edge to the other, and each of the first slots being offset from a respective associated second slot, a part of said strip defining a like multiplicity of recesses in said other edge thereof in each of which respective first and second slots communicate, a like multiplicity of first conducting members positioned edgewise in respective first slots and having respective tag connection portions projecting from said one edge of the strip, a like multiplicity of second conducting members positioned edgewise in respective second slots and having respective tag connection portions projecting from said one edge of the strip, a like multiplicity of first socket portions provided on respective first conducting members and located in respective recesses, and a like multiplicity of second socket portions provided on respective second conducting members, located in respective recesses and cooperating with respective first socket portions to define respective sockets at said other edge of the strip.

8. A unit as claimed in claim 7 in which said projecting portions of one set of said conducting members project further from said one face than said projecting portions of the other set, said projecting portions of said one set being provided with insulating collars over part of their lengths.

9. A unit as claimed in claim 8 in which said projecting portions of the other set of conducting members are located between respective aligned collars of adjacent elements to leave a plurality of passageways between adjacent rows of aligned collars.

10. A unit as claimed in claim 9 in which said strips are recessed along the paths of said passageways to form a plurality of channels.

11. A unit as claimed in claim 7 further including a pair of end plates clamping said elements therebetween, one of said end plates having an edge portion projecting outwardly from said one block face, which edge portion has holes therein aligned with said passageways.

* * * * *